US012794270B2

(12) United States Patent
Wong et al.

(10) Patent No.: US 12,794,270 B2
(45) Date of Patent: Nov. 10, 2026

(54) POWER SUPPLY CIRCUIT AND POWER SUPPLY DEVICE HAVING THE SAME

(71) Applicant: THE HONG KONG POLYTECHNIC UNIVERSITY, Hong Kong (CN)

(72) Inventors: Chi Shing Wong, Hong Kong (CN); Ka Hong Loo, Hong Kong (CN); Junwei Liu, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 0 days.

(21) Appl. No.: 19/030,091

(22) Filed: Jan. 17, 2025

(65) Prior Publication Data

US 2026/0189071 A1 Jul. 2, 2026

(30) Foreign Application Priority Data

Dec. 26, 2024 (CN) ......................... 202411948038.1

(51) Int. Cl.
*B60L 53/12* (2019.01)
*B60L 53/14* (2019.01)
(Continued)

(52) U.S. Cl.
CPC .............. *H02J 50/12* (2016.02); *B60L 53/12* (2019.02); *B60L 53/14* (2019.02); *B60L 53/22* (2019.02);
(Continued)

(58) Field of Classification Search
CPC .......... B60L 53/12; B60L 53/14; B60L 53/22; H02J 50/10; H02J 50/12; H02J 2207/20;
(Continued)

(56) References Cited

U.S. PATENT DOCUMENTS 6,160,374 A * 12/2000 Hayes ................. H02M 1/4258 320/108
8,933,661 B2 1/2015 Nergaard et al.
(Continued)

FOREIGN PATENT DOCUMENTS

EP 2431214 A1 3/2012
EP 2997636 B1 9/2021

OTHER PUBLICATIONS

Marques, et al., "A New Magnetic Coupler For EVs Chargers Based On Plug-In and IPT Technologies", IEEE, 2017, 7 pages.
(Continued)

*Primary Examiner* — Levi Gannon
(74) *Attorney, Agent, or Firm* — CANTOR COLBURN LLP

(57) ABSTRACT

A power supply circuit and a power supply device, and the power supply circuit includes a bridge switching circuit, a transformer, a resonant circuit, a rectifier circuit. The bridge switching circuit, the transformer, the resonant circuit, and the rectifier circuit are sequentially connected in series. The resonant circuit includes an induction coil connected in series between the transformer and the rectifier circuit. In the case that the inductive coil is connected in series in the circuit, the inductive coil can participate in conductive charging as an inductor in the resonant circuit. Further, the inductive coil can also receive the inductive voltage wirelessly transmitted by the external circuit through electromagnetic induction, and the inductive voltage can be transmitted to the load through the rectifier circuit to achieve inductive charging.

16 Claims, 5 Drawing Sheets

(51) Int. Cl.
*B60L 53/22* (2019.01)
*H02J 50/12* (2016.01)
*H02M 3/00* (2006.01)
*H02M 3/335* (2006.01)

(52) U.S. Cl.
CPC ......... *H02M 3/01* (2021.05); *H02M 3/33573* (2021.05); *H02J 2207/20* (2020.01)

(58) Field of Classification Search
CPC ............ H02M 3/01; H02M 3/22; H02M 3/24; H02M 3/335; H02M 3/33507; H02M 3/33523; H02M 3/33571; H02M 3/33573; H02M 3/33576; H02M 3/33584; H02M 3/33592; H02M 3/337; H02M 3/3376
See application file for complete search history.

(56) References Cited

U.S. PATENT DOCUMENTS 10,427,532 B2 10/2019 Elshaer et al.
2004/0179381 A1* 9/2004 Eguchi .............. H02M 3/33592 363/66
2012/0294047 A1* 11/2012 Wang ...................... H02M 3/01 363/21.02
2013/0336013 A1* 12/2013 Mueller ............ H02M 3/33573 363/17
2013/0343093 A1* 12/2013 Ando ................ H02M 3/33584 363/17
2019/0386571 A1* 12/2019 Dincan ............... H02M 3/3376
2022/0320884 A1* 10/2022 Hu .......................... H02J 7/875
2023/0402934 A1* 12/2023 Hu ...................... H02M 1/0058
2024/0106322 A1* 3/2024 Nakamura ........ H02M 3/33576
2024/0364226 A1* 10/2024 He ........................ H02M 3/335

OTHER PUBLICATIONS

Onar, et al., "Vehicular Integration of Wireless Power Transfer Systems and Hardware Interoperability Case Studies", IEEE, 2016, 8 pages.
Vu, et al., "A hybrid charger of conductive and inductive modes for Electric Vehicles", IEEE Transactions on Industrial Electronics, 2020, 13 pages.
Zhang et al., "Integration of Onboard Charger and Wireless Charging System For Electric Vehicles With Shared Coupler, Compensation, and Rectifier", IEEE Transactions on Industrial Electronics, vol. 70 , Issue: 7, Jul. 2023, 5 pages.

* cited by examiner

POWER SUPPLY CIRCUIT AND POWER SUPPLY DEVICE HAVING THE SAME

CROSS REFERENCE TO RELATED APPLICATION

Pursuant to 35 U.S.C. § 119 and the Paris Convention Treaty, this application claims the benefit of Chinese Patent Application No. 202411948038.1 filed on Dec. 26, 2024, the contents of which are incorporated herein by reference.

TECHNICAL FIELD

The present application relates to the field of charging technology, and more particularly to a power supply circuit and a power supply device.

BACKGROUND

Currently, the conductive charging is the most common and basic charging method for electric vehicles. However, with the continuous advancement of charging technology, the electric vehicles have achieved wireless charging through the inductive charging, especially by continuously arranging a plurality of wireless charging devices on the road to achieve dynamic charging while the vehicle is in motion. In order to achieve the above charging methods, the electric vehicles usually need to prepare a plurality of charging systems to cope with different charging modes, thus the overall charging system is too bulky and complex.

SUMMARY

An objective of the present application is to provide a power supply circuit and a power supply device, which is aimed to solve the problems that the traditional charging system is too bulky and complex.

In a first aspect of embodiments of the present application, a power supply circuit is provided, which includes: a bridge switching circuit, a transformer, a resonant circuit, a rectifier circuit; an first terminal of the bridge switching circuit is configured to connect with a power supply; a first terminal of the transformer is connected with a second terminal of the bridge switching circuit; a first terminal of the resonant circuit is connected with a second terminal of the transformer; a first terminal of the rectifier circuit is connected with a second terminal of the resonant circuit, and a second terminal of the rectifier circuit is configured to connect with a load; and the resonant circuit comprises an inductive coil connected in series between the transformer and the rectifier circuit.

In one of embodiments, the power supply further includes a mode switching circuit; a first terminal of the mode switching circuit is connected with the first terminal of the bridge switching circuit, a second terminal of the mode switching circuit is connected with the load; and the mode switching circuit is further configured to communicate the first terminal of the bridge switching circuit in a case that the inductive coil receives a dynamic change of an inductive voltage.

In one of embodiments, the bridge switching circuit is configured to generate and supply a compensation voltage to the load based on a voltage provided by the transformer in a case that the inductive coil receives the dynamic change of the inductive voltage.

In one of embodiments, the bridge switching circuit is configured to generate and supply a compensation voltage to the load based on a voltage provided by the transformer in a case that the power supply supplies power to the load.

In one of embodiments, the bridge switching circuit is configured to short-circuit a primary winding of the transformer in a case that the power supply circuit supplies the load based on an inductive voltage received by the inductive coil.

In one of embodiments, the resonant circuit further includes a resonant capacitor, a first terminal of the inductive coil is connected with a first terminal of a secondary winding of the transformer, a second terminal of the inductive coil is connected with a first terminal of the resonant capacitor, and a second terminal of the resonant capacitor is connected with the rectifier circuit.

In one of embodiments, the bridge switching circuit includes a first capacitor, a first switching tube, a second switching tube, a third switching tube, and a fourth switching tube; a first terminal of the first switching tube is connected with the first output terminal of the power supply, and a second terminal of the first switching tube is connected with a first terminal of the primary winding of the transformer; a first terminal of the second switching tube is connected with a second terminal of the first switching tube, and a second terminal of the second switching tube is connected with a second output terminal of the power supply; a first terminal of the third switching tube is connected with the first output terminal of the power supply, and a second terminal of the third switching tube is connected with a second terminal of the primary winding of the transformer; a first terminal of the fourth switching tube is connected with the second terminal of the third switching tube, and a second terminal of the fourth switching tube is connected with the second output terminal of the power supply; a first terminal of the first capacitor is connected with the first output terminal of the power supply, and a second terminal of the first capacitor is connected with the second output terminal of the power supply; and the mode switching circuit is respectively connected with the first terminal of the first switching tube and the second terminal of the second switching tube.

In one of embodiments, the mode switching circuit includes a first mode switching switch and a second mode switching switch; and a first terminal of the first mode switching switch is connected with the first terminal of the first switching tube, a second terminal of the first mode switching switch is connected with a first terminal of the load, a first terminal of the second mode switching switch is connected with the second terminal of the second switching tube, and a second terminal of the second mode switching switch is connected with a second terminal of the load.

In one of embodiments, the rectifier circuit includes a second capacitor, a first unidirectional conductive device, a second unidirectional conductive device, a third unidirectional conductive device, and a fourth unidirectional conductive device; and a first terminal of the first unidirectional conductive device is connected with the second terminal of the resonant capacitor, and a second terminal of the first unidirectional conductive device is connected with the first terminal of the load; a first terminal of the second unidirectional conductive device is connected with the second terminal of the load, and a second terminal of the second unidirectional conductive device is connected with the second terminal of the resonant capacitor; a first terminal of the third unidirectional conductive device is connected with a second terminal of the secondary winding of the transformer, and a second terminal of the third unidirectional conductive device is connected with the first terminal of the load; a first terminal of the fourth unidirectional conductive device is connected with the second terminal of the load, a second terminal of the fourth unidirectional conductive device is connected with the second terminal of the secondary winding of the transformer, a first terminal of the second capacitor is connected with the second terminal of the first unidirectional conductive device, and a second terminal of the second capacitor is connected with the first terminal of the second unidirectional conductive device.

In a second aspect of embodiments of the present application, a power supply device is provided, which includes the power supply circuit as above mentioned.

The beneficial effect of the embodiments of the present application compared to the prior art is that, in the case that the inductive coil is connected in series in the circuit, the inductive coil can participate in conductive charging as an inductor in the resonant circuit. Further, the inductive coil can also receive the inductive voltage wirelessly transmitted by the external circuit through electromagnetic induction, and the inductive voltage can be transmitted to the load through the rectifier circuit to achieve inductive charging.

By integrating the inductive coil into the resonant circuit, there is no need to separately set up additional compensation circuits for inductive charging, which can reduce the number of components in the power supply circuit and lower the manufacturing cost of the power supply circuit.

DETAILED DESCRIPTION OF EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

Figure 1:
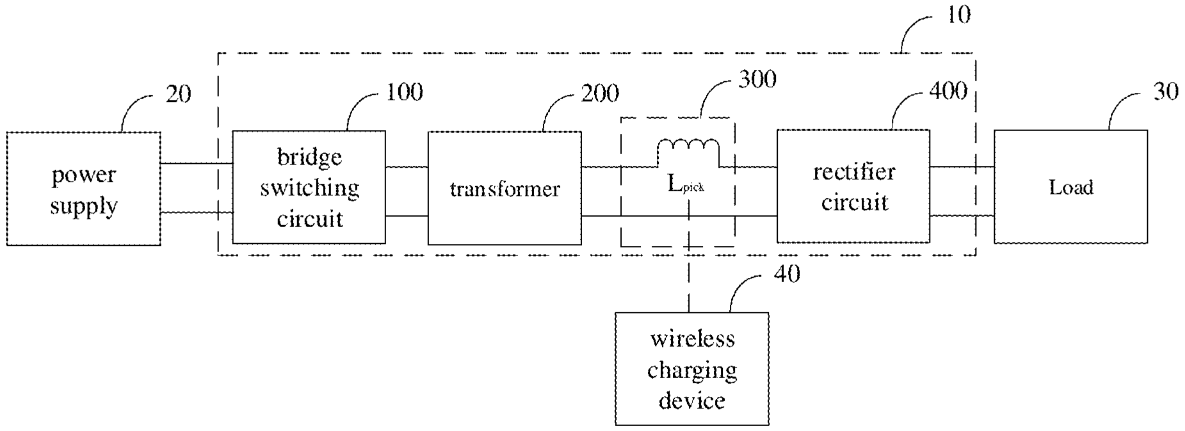
FIG. 1 is a schematic diagram of a power supply circuit provided in an embodiment of the present application.

FIG. 1 shows a schematic diagram of the power supply circuit provided in an embodiment of the present application. For ease of explanation, only the parts related to the embodiment are shown, detailed as follows:

The power supply circuit 10 includes: a bridge switching circuit 100, a transformer 200, a resonant circuit 300, and a rectifier circuit 400.

A first terminal of the bridge switching circuit 100 is configured to connect to the power supply 20. A first terminal of the transformer 200 is connected to a second terminal of the bridge switching circuit 100. A first terminal of the resonant circuit 300 is connected to a second terminal of the transformer 200. A first terminal of the rectifier circuit 400 is connected to a second terminal of the resonant circuit 300, and a second terminal of the rectifier circuit 400 is used to connect with the load 30. The resonant circuit 300 includes an inductive coil $L_{pick}$ connected in series between the transformer 200 and the rectifier circuit 400.

The power supply 20 can perform conduction charge to the load 30 through the bridge switching circuit 100, the transformer 200, the resonant circuit 300, and the rectifier circuit 400. In the case that the inductive coil $L_{pick}$ is connected in series in the circuit, the inductive coil $L_{pick}$ can not only participate in conduction charge as the inductor in the resonant circuit 300, but also, the inductive coil $L_{pick}$ can also receive the inductive voltage wirelessly transmitted by an external circuit (such as a wireless charging device 40) through electromagnetic induction, and the inductive voltage can be rectified by the rectifier circuit 400 and then transmitted to the load 30 to achieve inductive charging.

By integrating the inductive coil $L_{pick}$ into the resonant circuit 300, there is no need to provide additional compensation circuits separately for inductive charging, which can reduce the number of devices in the power supply circuit 10 and reduce the manufacturing cost of the power supply circuit 10.

In the embodiment, the load 30 can be the on-board battery or other electrical equipment of the electric vehicle. Through the power supply circuit 10, the on-board battery can be conductive charged based on the power supply voltage provided by the power supply 20, or the on-board battery can be inductive charged based on the inductive voltage generated by the inductive coil $L_{pick}$.

The turn ratio between the primary winding and the secondary winding of the transformer 200 can be 1:n, where the turn ratio can be set according to the actual need. The transformer 200 can specifically use a tightly coupled transformer, which can improve the power transmission efficiency of the power supply circuit 10.

Figure 2:
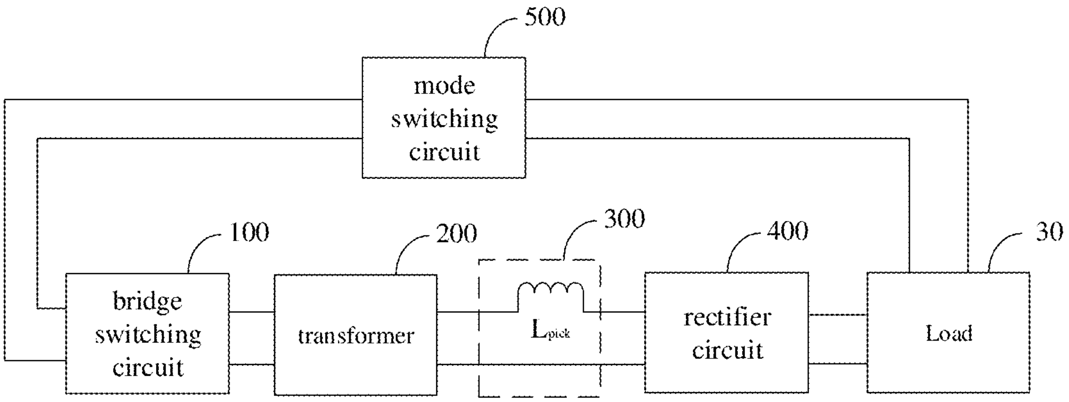
FIG. 2 is another schematic diagram of a power supply circuit provided in an embodiment of the present application.

In one embodiment, as shown in FIG. 2, the power supply circuit 10 further includes a mode switching circuit 500, the first terminal of the mode switching circuit 500 is connected to the first terminal of the bridge switching circuit 100, and the second terminal of the mode switching circuit 500 is configured to connect to the load 30. The mode switching circuit 500 is configured to communicate the first terminal of the bridge switching circuit 100 to the load 30 when the inductive coil $L_{pick}$ receives a dynamically varying inductive voltage.

When dynamic charging is carried out on the vehicle, the main scheme used at present is to bury a plurality of wireless charging devices 40 in the road, and the vehicle carry out inductive charging through the sequential relay of each wireless charging device 40, so as to realize dynamic charging of the vehicle during the driving process.

Specifically, the mutual inductance between the inductive coil $L_{pic}$k and each wireless charging device 40 varies as the moving of the vehicle. It is understood that one wireless charging device 40 can provide an inductive voltage to the inductive coil $L_{pick}$, and the voltage value of the inductive voltage will change from small to large, and then from large to small. In this way, when the vehicle successively passes through a number of continuously arranged wireless charging devices 40, the inductive coil $L_{pick}$ can obtain a dynamically changing continuous inductive voltage.

When the mode switching circuit 500 is turned on, and the first terminal of the bridge switching circuit 100 is connected to the load 30, a part of the electrical energy received by the inductive coil $L_{pick}$ is transmitted to the load 30 through the rectifier circuit 400, the other part of the electric energy can be transmitted to the load 30 through the transformer 200, the bridge switching circuit 100 and the mode switching circuit 500 being turned on. According to the actual need, the electric energy transmitted by the bridge switching circuit 100 can be adjusted to a certain extent by controlling the on-time, switching frequency and other parameters of each switching device in the bridge switching circuit 100. For example, the pulse width modulation (PWM) technology regulates the duty cycle of the drive signal provided to each switching device, thus the electrical energy transmitted by the bridge switching circuit 100 can be regulated.

In one embodiment, the bridge switching circuit 100 is configured to generate and supply a compensation voltage to the load 30 based on the voltage provided by the transformer 200 in the case that the inductive coil $L_{pick}$ receives a dynamically changing inductive voltage, where the compensation voltage is inversely with the inductive voltage.

At the same time, the power supply circuit in the present embodiment has higher power supply efficiency, higher device utilization, and higher power density than regulating the full power output of the inductive coil $L_{pick}$ by providing an independent voltage regulating circuit at the output terminal of the rectifier circuit 400 and the load 30.

Figure 3:
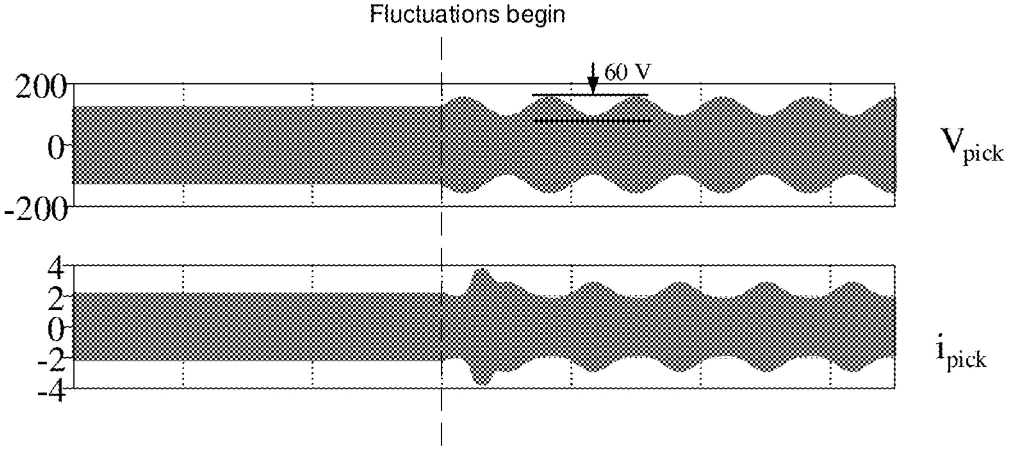
FIG. 3 is a waveform diagram of an inductive voltage and an inductive current provided in an embodiment of the present application.

As shown in FIG. 3, when the vehicle is dynamically charged, the calculation formula of the inductive voltage $V_{pick}$ is as follows:

$$V_{pick} = j\omega\Delta M I_T \tag{1}$$

In the formula (1), ΔM is the mutual inductance between the inductive coil $L_{pick}$ and each wireless charging device 40 in the dynamic charging mode, and $I_T$ is the inductive output current of the wireless charging device 40. Since the ΔM between the inductive coil $L_{pick}$ and each wireless charging device 40 will change constantly, the inductive voltage $V_{pick}$ will also change dynamically, the inductive current $i_{pick}$ provided to the rectifier circuit 400 will also change dynamically. If the load 30 is powered only after the rectifier circuit 400 is rectified, the voltage and current received by the load 30 will also change dynamically, which will not only affect the normal operation of the load 30, but also affect the service life of the load 30.

Figure 4:
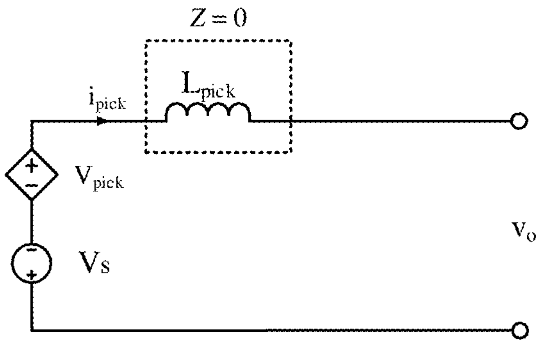
FIG. 4 is an equivalent circuit diagram of ta resonant circuit in ta dynamic charging mode provided in an embodiment of the present application.
Figure 5:
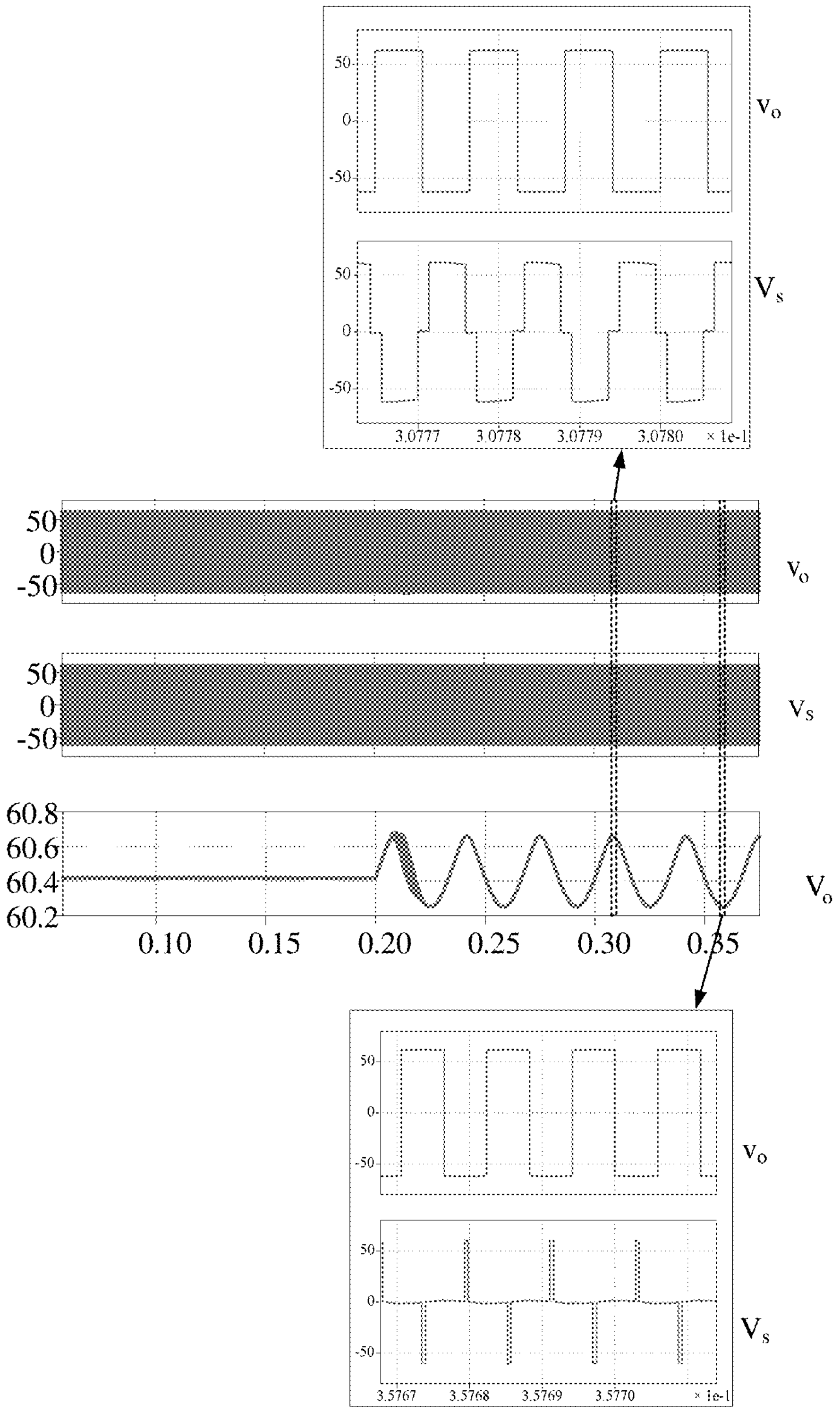
FIG. 5 is a waveform diagram of a first voltage, a second voltage, and a rectified output voltage provided in an embodiment of the present application.
Figure 6:
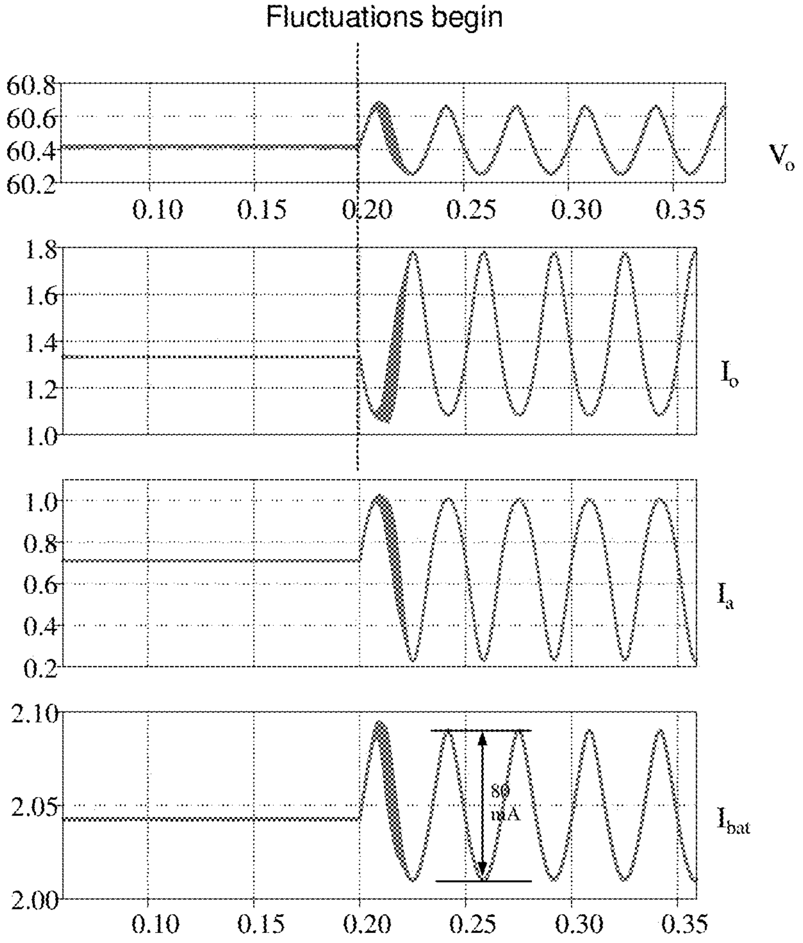
FIG. 6 is a waveform diagram of ta rectified output current, a compensation current, and a load current provided in an embodiment of the present application.

In the case that the bridge switching circuit 100 provides the compensation voltage to the load 30, and the compensation voltage is in reverse phase with the inductive voltage, the equivalent circuit of the resonant circuit 300 is shown in FIG. 4, and the impedance Z of the resonant circuit 300 can be regarded as 0. The waveforms of the first voltage $v_o$ output by the resonant circuit 300 to the rectifier circuit 400, the second voltage $V_S$ obtained by the transformer 200 from the resonant circuit 300 (that is, the voltage at both ends of the secondary winding of the transformer 200) and the rectifying output voltage $V_o$ output by the rectifier circuit 400 are shown in FIG. 5; the waveforms of the rectifying output current $I_o$ output by the rectifier circuit 400, the compensation current $I_a$ output by the mode switching circuit 500, and the load current $I_{bat}$ are shown in FIG. 6. The variation amplitude of rectifying output voltage $V_o$ of the rectifier circuit 400 in FIG. 5 is about 0.4V, and the variation amplitude of the load current 30 $I_{bat}$ in FIG. 6 is about 80 mA. The transformer 200 can be regulated to obtain a second voltage $V_S$ from the resonant circuit 300, and the bridge switching circuit 100 can continuously adjust the second voltage $V_S$ through the PWM technology to offset the fluctuation of inductive voltage $V_{pick}$ caused by mutual inductance change, so that the rectifying output voltage $V_o$ output of the rectifier circuit 400 can maintain a stable and smooth output power of the power supply circuit 10. At the same time, the overall power supply efficiency of the power supply circuit 10 can also be improved through the compensation current $I_a$ output by the mode switching circuit 500. The calculation formula of the second voltage $V_S$ as follows:

$$V_S = nV_{con} \tag{2}$$

In the formula (2), $V_{con}$ is the voltage at both ends of the primary winding of the transformer 200, and the voltage $V_{con}$ can be controlled by controlling the duty cycle of the drive signal provided to each switching device in the bridge switching circuit 100, and then generate the corresponding compensation voltage.

In some embodiments, the power supply circuit 10 further includes a control module, and the control module outputs the corresponding drive signal to control the on-off of each switching device in the bridge switching circuit 100. The control module can include a chip and other logic control devices, circuits.

In some embodiments, the control module can further sample the inductive voltage to control the bridge switching circuit 100 to generate a compensation voltage inverting the inductive voltage based on the waveform of the inductive voltage.

In some embodiments, a distance between any two adjacent wireless charging devices 40 is equal to a preset distance, such that the wireless charging devices 40 are successively arranged along the dynamic charging line in an equal distance. When the vehicle is in the dynamic charging mode, the vehicle can be controlled to drive at a preset speed along the dynamic charging line at a constant speed. At this time, the control module can determine the waveform, phase and other electrical parameters of the inductive voltage without sampling and detection, and then can control the bridge switching circuit 100 to generate a compensation voltage that is in reverse phase with the inductive voltage. The preset distance and the preset speed can be set according to the actual needs, and which is not limited in the present embodiment.

In one embodiment, the bridge switching circuit 100 is configured to generate and supply an input voltage to the transformer 200 based on the voltage provided by the power supply 20 when the power supply 20 is supplying power to the load 30.

When the power supply circuit 10 is operating in the conductive charging mode, the power supply 20 can supply a voltage to the bridge switching circuit 100, and the bridge switching circuit 100 can control the turn-on and turn-off of each switching device within itself according to the corresponding drive signal, so as to generate input voltage at the first terminal of the transformer 200 based on the supply voltage. The input voltage can be successively transmitted to the load 30 through the transformer 200, the resonant circuit 300, and the rectifier circuit 400. The switching frequency of each switching device in the bridge switching circuit 100 is greater than the resonant frequency of the resonant circuit 300. In the embodiment, the bridge switching circuit 100 is used as an inverter to invert the supply voltage.

In one embodiment, the bridge switching circuit 100 is configured to short-circuit the primary winding of the transformer 200 when the power supply circuit 10 supplies power to the load 30 based on the inductive voltage received by the inductive coil $L_{pick}$.

Figure 7:
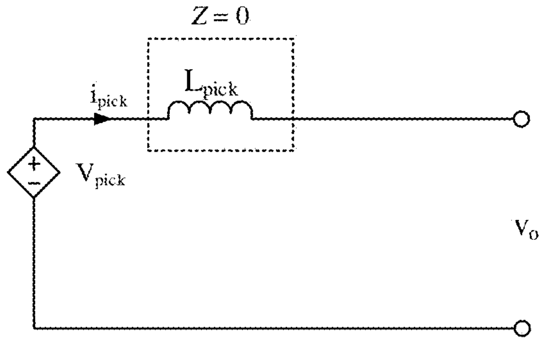
FIG. 7 is an equivalent circuit diagram of a resonant circuit in an inductive charging mode provided in an embodiment of the present application.

When the vehicle is at rest, the vehicle can obtain a stable inductive voltage through the corresponding wireless charging device 40 for inductive charging. At this time, the equivalent circuit of the resonant circuit 300 is shown in FIG. 7. The primary winding of the transformer 200 is shorted through the bridge switching circuit 100, and the power supply circuit 10 can supply power to the load 30 through the inductive coil $L_{pick}$ and the rectifier circuit 400 based on the inductive voltage. The calculation formula of the inductive voltage $V_{pick}$ is as follows:

$$V_{pick} = j\omega MI_T \tag{3}$$

In the formula (3), M is the mutual inductance between the inductive coil $L_{pick}$ and the inductive output coil of the corresponding wireless charging device 40 under the inductive charging mode.

Figure 8:
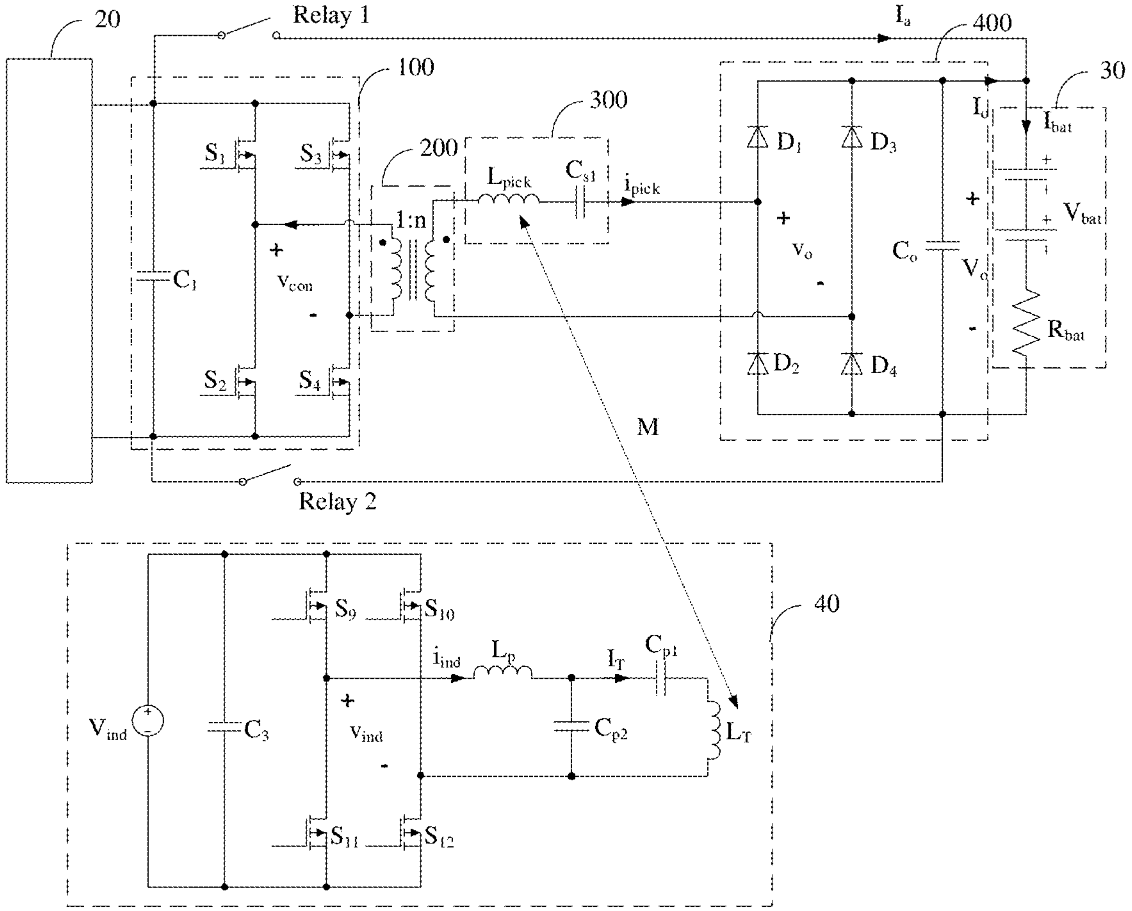
FIG. 8 is a schematic diagram of a power supply circuit provided in an embodiment of the present application.

In one embodiment, as shown in FIG. 8, the resonant circuit 300 further includes a resonant capacitor $C_{s1}$, the first terminal of the inductive coil $L_{pick}$ is connected to the first terminal of the secondary winding of the transformer 200, the second terminal of the inductive coil $L_{pick}$ is connected to the first terminal of the resonant capacitor $C_{s1}$, and the second terminal of the resonant capacitor $C_{s1}$ is connected to the rectifier circuit 400.

When the power supply circuit 10 is operating in the conductive charging mode, the resonant circuit 300 can filter the electrical signal output from the second terminal of the transformer 200. The filter frequency of the resonant circuit 300 can be adjusted according to the actual need by configuring the resonant capacitor $C_{s1}$ and the specific impedance parameters of the inductive voltage.

In one embodiment, the bridge switching circuit 100 includes a first capacitor $C_1$, a first switching tube $S_1$, a second switching tube $S_2$, a third switching tube $S_3$, and a fourth switching tube $S_4$. The first terminal of the first switching tube $S_1$ is connected to the first output terminal of the power supply 20, and the second terminal of the first switching tube $S_1$ is connected to the first terminal of the primary winding of the transformer 200. The first terminal of the second switching tube $S_2$ is connected to the second terminal of the first switching tube $S_1$, and the second terminal of the second switching tube $S_2$ is connected to the second output terminal of the power supply 20. The first terminal of the third switching tube $S_3$ is connected to the first output terminal of the power supply 20, and the second terminal of the third switching tube $S_3$ is connected to the second terminal of the primary winding of the transformer 200. The first terminal of the fourth switching tube $S_4$ is connected to the second terminal of the third switching tube $S_3$, and the second terminal of the fourth switching tube $S_4$ is connected to the second output terminal of the power supply 20. The first terminal of the first capacitor $C_1$ is connected to the first output terminal of the power supply 20, and the second terminal of the first capacitor $C_1$ is connected to the second output terminal of the power supply 20. The mode switching circuit 500 is respectively connected to the first terminal of the first switching tube $S_1$ and the second terminal of the second switching tube $S_2$.

When the power supply circuit 10 is operating in the conductive charging mode, the bridge switching circuit 100 can realize the inverter of the power supply voltage and obtain the input voltage by controlling the turn-on and turn-off of each switching tube.

When the power supply circuit 10 is operating in the inductive charging mode, the bridge switching circuit 100 can short-circuit the primary winding of the transformer 200 by controlling the first switching tube $S_1$ and the third switching tube $S_3$ (or controlling the the second switching tube $S_2$ and the fourth switching tube $S_4$ to be turned on simultaneously) to be turned on simultaneously.

When the power supply circuit 10 is operating in the dynamic charging mode, the bridge switching circuit 100 can generate and supply the compensation voltage to the load 30 through the mode switching circuit 500 based on the voltage provided by the first terminal of the transformer 200 by controlling the turn-on and turn-off of each switching tube.

In the embodiment, the first switching tube $S_1$, the second switching tube $S_2$, the third switching tube $S_3$, and the fourth switching tube $S_4$ can all be N-type MOS tubes.

In one embodiment, the mode switching circuit 500 includes a first mode switching switch Relay1 and a second mode switching switch Relay2. The first terminal of the first mode switching switch Relay1 is connected to the first terminal of the first switching tube $S_1$, the second terminal of the first mode switching switch Relay1 is connected to the first terminal of the load 30, the first terminal of the second mode switching switch Relay2 is connected to the second terminal of the second switching tube $S_2$, and the second terminal of the second mode switching switch Relay2 is connected to the second terminal of the load 30.

When the power supply circuit 10 is operating in the conductive charge or inductive charge mode, the first mode switching switch Relay1 and the second mode switching switch Relay2 can be controlled to be turned off at the same time. When the power supply circuit 10 is operating in the dynamic charging mode, the first mode switching switch Relay1 and the second mode switching switch Relay2 can be controlled to be turned on at the same time.

The first mode switching switch Relay1 and the second mode switching switch Relay2 can both be relays.

In one embodiment, the rectifier circuit 400 comprises a second capacitor $C_2$, a first unidirectional conductive device $D_1$, a second unidirectional conductive device $D_2$, a third unidirectional conductive device $D_3$, and a fourth unidirectional conductive device $D_4$. The first terminal of the first unidirectional conductive device $D_1$ is connected to the second terminal of the resonant capacitor $C_{s1}$, and the second terminal of the first unidirectional conductive device $D_1$ is connected to the first terminal of the load 30. The first terminal of the second unidirectional conductive device $D_2$ is connected to the second terminal of the load 30, and the second terminal of the second unidirectional conductive device $D_2$ is connected to the second terminal of the resonant capacitor $C_{s1}$. The first terminal of the third unidirectional conductive device $D_3$ is connected to the second terminal of the secondary winding of the transformer 200, and the second terminal of the third unidirectional conductive device $D_3$ is connected to the first terminal of the load 30. The first terminal of the fourth unidirectional conductive device $D_4$ is connected to the second terminal of the load 30, and the second terminal of the fourth unidirectional conductive device $D_4$ is connected to the second terminal of the secondary winding of the transformer 200. The first terminal of the second capacitor $C_O$ is connected to the second terminal of the first unidirectional conductive device $D_1$, and the second terminal of the second capacitor $C_O$ is connected to the first terminal of the second unidirectional conductive device $D_2$.

The rectifier circuit 400 consist of the first unidirectional conductive device $D_1$, the second unidirectional conductive device $D_2$, the third unidirectional conductive device $D_3$ and the fourth unidirectional conductive device $D_4$ can rectify the electrical signal output of the resonant circuit 300 and convert the alternating current into the direct current.

The first unidirectional conductive device $D_1$, the second unidirectional conductive device $D_2$, the third unidirectional conductive device $D_3$, and the fourth unidirectional conductive device $D_4$ can all be diodes.

An embodiment of the present application further provides a power supply device including a power supply circuit as described in one of the above embodiments.

Since the power supply device includes a power supply circuit of any of the above embodiments, the power supply device has the beneficial effects of the power supply circuit of any of the above embodiments, which are not detailed here.

The power supply device can be applied to technical fields such as electric vehicles, electric bicycles, electric robots or drones, and can be integrated in the corresponding device or as an external charger to charge the battery of the relevant electrical device.

It can be clearly understood by those skilled in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, which is not repeatedly described herein.

In the aforesaid embodiments, the description of each of the embodiments is emphasized respectively, regarding a part of one embodiment which isn't described or disclosed in detail, please refer to relevant descriptions in some other embodiments.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A power supply circuit, comprising:

a bridge switching circuit, wherein an first terminal of the bridge switching circuit is configured to connect with a power supply;

a transformer, wherein a first terminal of the transformer is connected with a second terminal of the bridge switching circuit;

a resonant circuit, wherein a first terminal of the resonant circuit is connected with a second terminal of the transformer;

a rectifier circuit, wherein a first terminal of the rectifier circuit is connected with a second terminal of the resonant circuit, and a second terminal of the rectifier circuit is configured to connect with a load; and wherein the resonant circuit comprises an inductive coil connected in series between the transformer and the rectifier circuit; and wherein the power supply circuit further comprises a mode switching circuit; wherein a first terminal of the mode switching circuit is connected with the first terminal of the bridge switching circuit, a second terminal of the mode switching circuit is connected with the load; and the mode switching circuit is further configured to communicate the first terminal of the bridge switching circuit in a case that the inductive coil receives a dynamic change of an inductive voltage.

2. The power supply circuit according to the claim 1, wherein the bridge switching circuit is configured to generate and supply a compensation voltage to the load based on a voltage provided by the transformer in a case that the inductive coil receives the dynamic change of the inductive voltage.

3. The power supply circuit according to claim 2, wherein the resonant circuit further comprises a resonant capacitor, a first terminal of the inductive coil is connected with a first terminal of a secondary winding of the transformer, a second terminal of the inductive coil is connected with a first terminal of the resonant capacitor, and a second terminal of the resonant capacitor is connected with the rectifier circuit.

4. The power supply circuit according to claim 2, wherein the bridge switching circuit comprises a first capacitor, a first switching tube, a second switching tube, a third switching tube, and a fourth switching tube;

a first terminal of the first switching tube is connected with a first output terminal of the power supply, and a second terminal of the first switching tube is connected with a first terminal of the primary winding of the transformer; a first terminal of the second switching tube is connected with a second terminal of the first switching tube, and a second terminal of the second switching tube is connected with a second output terminal of the power supply; a first terminal of the third switching tube is connected with the first output terminal of the power supply, and a second terminal of the third switching tube is connected with a second terminal of the primary winding of the transformer; a first terminal of the fourth switching tube is connected with the second terminal of the third switching tube, and a second terminal of the fourth switching tube is connected with the second output terminal of the power supply; a first terminal of the first capacitor is connected with the first output terminal of the power supply, and a second terminal of the first capacitor is connected with the second output terminal of the power supply; and the mode switching circuit is respectively connected with the first terminal of the first switching tube and the second terminal of the second switching tube.

5. The power supply circuit according to the claim 1, wherein the bridge switching circuit is configured to generate and supply a compensation voltage to the load based on a voltage provided by the transformer in a case that the power supply supplies power to the load.

6. The power supply circuit according to claim 5, wherein the resonant circuit further comprises a resonant capacitor, a first terminal of the inductive coil is connected with a first terminal of a secondary winding of the transformer, a second terminal of the inductive coil is connected with a first terminal of the resonant capacitor, and a second terminal of the resonant capacitor is connected with the rectifier circuit.

7. The power supply circuit according to claim 5, wherein the bridge switching circuit comprises a first capacitor, a first switching tube, a second switching tube, a third switching tube, and a fourth switching tube;

a first terminal of the first switching tube is connected with a first output terminal of the power supply, and a second terminal of the first switching tube is connected with a first terminal of the primary winding of the transformer; a first terminal of the second switching tube is connected with a second terminal of the first switching tube, and a second terminal of the second switching tube is connected with a second output terminal of the power supply; a first terminal of the third switching tube is connected with the first output terminal of the power supply, and a second terminal of the third switching tube is connected with a second terminal of the primary winding of the transformer; a first terminal of the fourth switching tube is connected with the second terminal of the third switching tube, and a second terminal of the fourth switching tube is connected with the second output terminal of the power supply; a first terminal of the first capacitor is connected with the first output terminal of the power supply, and a second terminal of the first capacitor is connected with the second output terminal of the power supply; and the mode switching circuit is respectively connected with the first terminal of the first switching tube and the second terminal of the second switching tube.

8. The power supply circuit according to the claim 1, wherein the bridge switching circuit is configured to short-circuit a primary winding of the transformer in a case that the power supply circuit supplies the load based on the inductive voltage received by the inductive coil.

9. The power supply circuit according to claim 8, wherein the resonant circuit further comprises a resonant capacitor, a first terminal of the inductive coil is connected with a first terminal of a secondary winding of the transformer, a second terminal of the inductive coil is connected with a first terminal of the resonant capacitor, and a second terminal of the resonant capacitor is connected with the rectifier circuit.

10. The power supply circuit according to claim 8, wherein the bridge switching circuit comprises a first capacitor, a first switching tube, a second switching tube, a third switching tube, and a fourth switching tube;

a first terminal of the first switching tube is connected with a first output terminal of the power supply, and a second terminal of the first switching tube is connected with a first terminal of the primary winding of the transformer; a first terminal of the second switching tube is connected with a second terminal of the first switching tube, and a second terminal of the second switching tube is connected with a second output terminal of the power supply; a first terminal of the third switching tube is connected with the first output terminal of the power supply, and a second terminal of the third switching tube is connected with a second terminal of the primary winding of the transformer; a first terminal of the fourth switching tube is connected with the second terminal of the third switching tube, and a second terminal of the fourth switching tube is connected with the second output terminal of the power supply; a first terminal of the first capacitor is connected with the first output terminal of the power supply, and a second terminal of the first capacitor is connected with the second output terminal of the power supply; and the mode switching circuit is respectively connected with the first terminal of the first switching tube and the second terminal of the second switching tube.

11. The power supply circuit according to claim 1, wherein the resonant circuit further comprises a resonant capacitor, a first terminal of the inductive coil is connected with a first terminal of a secondary winding of the transformer, a second terminal of the inductive coil is connected with a first terminal of the resonant capacitor, and a second terminal of the resonant capacitor is connected with the rectifier circuit.

12. The power supply circuit according to the claim 1, wherein the resonant circuit further comprises a resonant capacitor, a first terminal of the inductive coil is connected with a first terminal of a secondary winding of the transformer, a second terminal of the inductive coil is connected with a first terminal of the resonant capacitor, and a second terminal of the resonant capacitor is connected with the rectifier circuit.

13. The power supply circuit according to the claim 1, wherein the bridge switching circuit comprises a first capacitor, a first switching tube, a second switching tube, a third switching tube, and a fourth switching tube;

a first terminal of the first switching tube is connected with a first output terminal of the power supply, and a second terminal of the first switching tube is connected with a first terminal of the primary winding of the transformer; a first terminal of the second switching tube is connected with a second terminal of the first switching tube, and a second terminal of the second switching tube is connected with a second output terminal of the power supply; a first terminal of the third switching tube is connected with the first output terminal of the power supply, and a second terminal of the third switching tube is connected with a second terminal of the primary winding of the transformer; a first terminal of the fourth switching tube is connected with the second terminal of the third switching tube, and a second terminal of the fourth switching tube is connected with the second output terminal of the power supply; a first terminal of the first capacitor is connected with the first output terminal of the power supply, and a second terminal of the first capacitor is connected with the second output terminal of the power supply; and the mode switching circuit is respectively connected with the first terminal of the first switching tube and the second terminal of the second switching tube.

14. The power supply circuit according to the claim 13, wherein the mode switching circuit comprises a first mode switching switch and a second mode switching switch; and a first terminal of the first mode switching switch is connected with the first terminal of the first switching tube, a second terminal of the first mode switching switch is connected with a first terminal of the load, a first terminal of the second mode switching switch is connected with the second terminal of the second switching tube, and a second terminal of the second mode switching switch is connected with a second terminal of the load.

15. The power supply circuit according to the claim 13, wherein the rectifier circuit comprises a second capacitor, a first unidirectional conductive device, a second unidirectional conductive device, a third unidirectional conductive device, and a fourth unidirectional conductive device;

a first terminal of the first unidirectional conductive device is connected with the second terminal of the resonant capacitor, and a second terminal of the first unidirectional conductive device is connected with the first terminal of the load; a first terminal of the second unidirectional conductive device is connected with the second terminal of the load, and a second terminal of the second unidirectional conductive device is connected with the second terminal of the resonant capacitor; a first terminal of the third unidirectional conductive device is connected with a second terminal of the secondary winding of the transformer, and a second terminal of the third unidirectional conductive device is connected with the first terminal of the load; a first terminal of the fourth unidirectional conductive device is connected with the second terminal of the load, a second terminal of the fourth unidirectional conductive device is connected with the second terminal of the secondary winding of the transformer, a first terminal of the second capacitor is connected with the second terminal of the first unidirectional conductive device, and a second terminal of the second capacitor is connected with the first terminal of the second unidirectional conductive device.

16. A power supply device, comprising a power supply circuit;

wherein the power supply circuit comprises:

a bridge switching circuit, wherein an first terminal of the bridge switching circuit is configured to connect with a power supply;

a transformer, wherein a first terminal of the transformer is connected with a second terminal of the bridge switching circuit;

a resonant circuit, wherein a first terminal of the resonant circuit is connected with a second terminal of the transformer;

a rectifier circuit, wherein a first terminal of the rectifier circuit is connected with a second terminal of the resonant circuit, and a second terminal of the rectifier circuit is configured to connect with a load; and wherein the resonant circuit comprises an inductive coil connected in series between the transformer and the rectifier circuit; and wherein the power supply circuit further comprises a mode switching circuit; wherein a first terminal of the mode switching circuit is connected with the first terminal of the bridge switching circuit, a second terminal of the mode switching circuit is connected with the load;

and the mode switching circuit is further configured to communicate the first terminal of the bridge switching circuit in a case that the inductive coil receives a dynamic change of an inductive voltage.

* * * * *